United States Patent [19]
Gordon

[11] 4,024,853
[45] May 24, 1977

[54] SOLAR HEATER

[76] Inventor: Robert M. Gordon, 62, New Windsor Road, Avondale, Auckland, New Zealand

[22] Filed: May 2, 1975

[21] Appl. No.: 573,949

[52] U.S. Cl. .............................. 126/271; 165/168; 165/171; 165/173

[51] Int. Cl.² .............................................. F24J 3/02

[58] Field of Search ........... 126/270, 271; 237/1 A; 165/143, 144, 174, 175, 176, 153; 285/132, 137 R, 156, 176, DIG. 16; 137/271, 608

[56] References Cited

UNITED STATES PATENTS

| | | | |
|---|---|---|---|
| 1,250,260 | 12/1917 | Wilcox | 126/271 |
| 3,239,000 | 3/1966 | Meagher | 126/271 |
| 3,705,622 | 12/1972 | Schwarz | 165/143 |
| 3,799,145 | 3/1974 | Butterfield | 126/271 |

*Primary Examiner*—Kenneth W. Sprague
*Assistant Examiner*—James C. Yeung
*Attorney, Agent, or Firm*—William Anthony Drucker

[57] ABSTRACT

The invention provides a solar heating arrangement which has a plurality of substantially hollow elongate members with at least one fluid passage way therein, a plurality of substantially hollow connecting members each adapted to interlock one with the other, each connecting member being adapted so as to interlock with a respective elongate member at each end thereof, the connecting members and the elongate members being interlocked to form a heating arrangement which, when in use, has fluid flowing through it.

7 Claims, 3 Drawing Figures

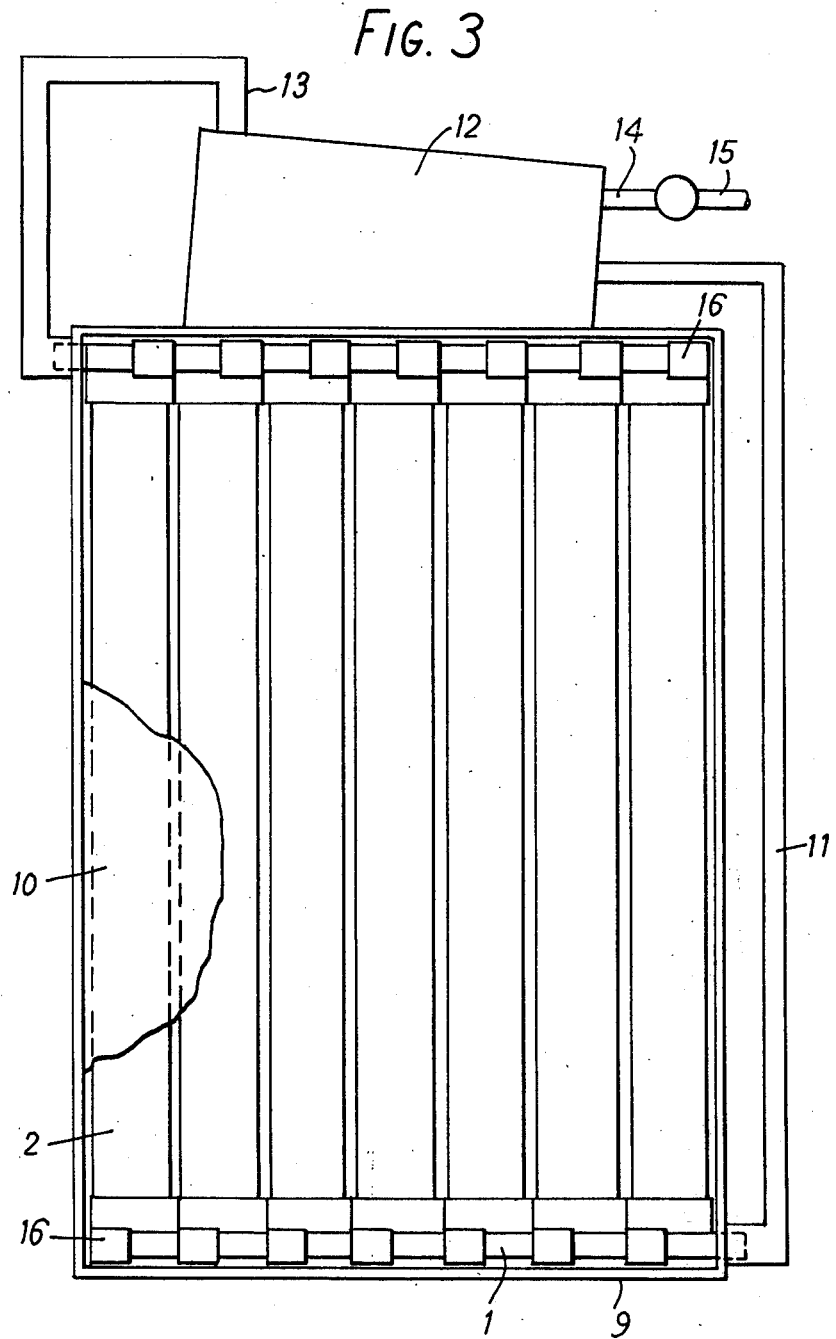

SOLAR HEATER

This invention relates to improvements in and relating to solar fluid heating arrangements and more especially to a heating arrangement which is especially suitable for use in a solar fluid heating arrangement.

It is an object of one embodiment of this invention to provide a heating arrangement which is formed from a plurality of interlocking components which enable the speedy assembly of the heating arrangement and which heating arrangement provides, in one embodiment of the invention, the efficient heating of a fluid passing therethrough by means of solar energy incident thereon.

It is an object of a further embodiment of the invention to provide a heating arrangement which may be utilized in domestic radiators and other similar assemblies and which is formed from a plurality of interlocking components.

Further objects of this invention will become apparent from the following description.

According to one aspect of this invention there is provided:

a heating arrangement comprising:
 a plurality of substantially hollow elongate members provided with at least one fluid passageway therein, a plurality of substantially hollow connecting members, each connecting member being adapted so as to interlock one with the other,
 each connecting member being adapted so as to interlock with a respective elongate member, at one end thereof, said connecting members and said elongate members being interlocked to form said heating arrangement, with fluid passing therethrough in use.

Further aspects of this invention, which should be considered in all its novel aspects, will become apparent from the following description, given by way of example of a preferred embodiment of the invention, and in which reference is made to the accompanying drawings, wherein.

FIG. 3: shows the heating arrangement of a preferred embodiment of the invention incorporated in a solar heating installation.

The present invention provides a heating arrangement which is readily assembled from a plurality of interlocking components, said components defining fluid passage ways through said heating arrangement, said heating arrangement being especially adapted to be utilized in a solar heating installation whereby a fluid, such as water, passing through the heating arrangement is heated by means of solar energy incident upon the heating arrangment.

However, the heating arrangement of the present invention could be utilized in domestic radiators and other heating apparatus and not necessarily only in a solar heating installation.

Figure 1:
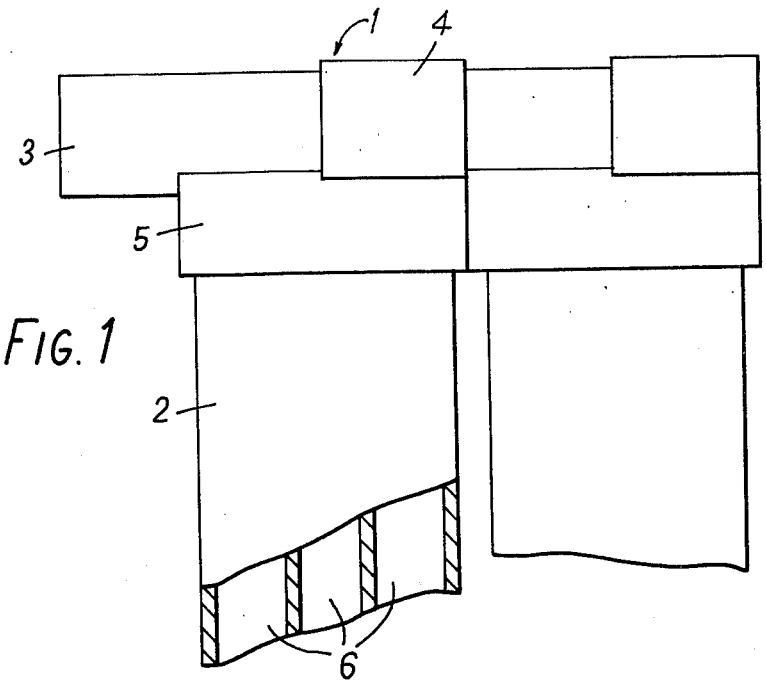
FIG. 1 shows part of the heating arrangement according to a preferred embodiment of the invention.
Figure 2:
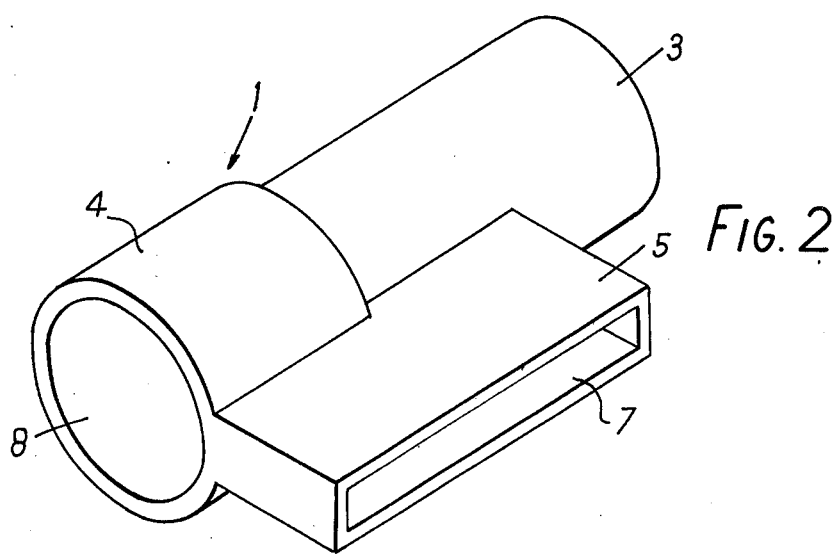
FIG. 2 shows the connecting member of the heating arrangement of FIG. 1.

Referring now to FIGS. 1 and 2 of the accompanying drawings, a heating arrangement is formed from a plurality (only two being shown) of interlocking components comprising an elongate substantially hollow member 2 provided with one or more passages 6, three being shown in FIG. 1. Each elongate member 2 is interlocked at each end thereof with a connecting member 1, the respective ends of the elongate member 2 being inserted within a slotted projection 5 of the connecting member 1.

An upper part of each connecting member 1 is provided with substantially tubular portions 3 and 4, the tubular portion 3 extending outwardly in a lateral direction from one side of the connecting member 1.

The tubular portion 4 has an inside diameter substantially corresponding with the outside diameter of the tubular portions 3 such that the tubular portion 3 of one connecting member 1 is insertable within the tubular portion 4 of an adjacent connecting member 1 so as to interlock adjacent connecting members 1 together.

The slotted projection 5 of the connecting member 1 of FIG. 2, is shown provided with a substantially rectangular aperture 7, whilst the tubular portion 4 of the connecting member 1 is shown provided with a substantially circular aperture 8 into which a tubular portion 3 of an adjacent connecting member 1 is inserted.

The heating arrangement of the present invention is thus provided with a plurality of interlocked connecting members 1 along the top and bottom of a plurality of substantially parallel connecting members 2. The connecting members 1 and elongate members 2 are, in a preferred embodiment of the invention, formed by a suitable moulding process and are of any suitable mouldable material, and preferably heat resistant plastics such as chlorinated P.V.C. The elongate members 2 are provided with a substantially rectangular cross section and are of a suitable size so as to be a tight fit within the rectangular aperture 7 in the slotted projection 5 of a connecting member 1. A suitable adhesive is provided which ensures that the interlocking of the connecting members 1 and the elongate members 2 is secure, which adhesive also provides a sealing effect around the interlocking portions of the components of the heating arrangement. The elongate member 2 is shown as provided with three fluid passageways defined therein but any number could of course be provided as and when required. The connecting members 1 and the elongate members 2 may be provided in any black plastics or the like, or may alternatively be provided with a surface coating of a suitable black paint or other covering, so as to enchance the thermal efficiency of the arrangement.

Referring now more particularly to FIG. 3 of the accompanying drawings, the heating arrangement of the present invention is shown provided in a solar heating installation, a plurality of connecting members 1 being interlocked with elongate members 2 and defining a plurality of fluid passageways between an inlet pipe connection 11 and an outlet pipe connection 13. In the arrangement shown, the tubular portions 4 of diagonally opposite connecting members 1, referenced in FIG. 3 by numeral 16, are suitably blanked off at their respective apertures 8, which blanking off can be effected either during or after the formation of these corner connecting members 1.

The heating arrangement is shown mounted within a housing 9, said housing being of any suitable material, for example of metal sheet, fibreglass, plastics or the like, the heating arrangement being mounted on suitable thermal insulation, such as polyurethane foam, which may preferably be shaped so as to accommodate the components 1 and 2 of the heating arrangement.

A sheet of at least semi-transparent material 10, such as glass, is mounted over the housing 9 across the upper surface thereof, such that solar energy incident on the solar insulation shown in FIG. 3 heats fluid passing through the heating arrangement from fluid inlet connection 11 to fluid outlet connection 13.

It is envisaged that a plurality of housings 9 each with their respective heating arrangements may be mounted adjacent one another and be interconnected so as to provide a greater heating effect as the fluid passes through the heating installations connected in parallel.

A fluid reservoir 12 may preferably be provided as a light copper tank which is provided with suitable thermal insulation, such as polyurethane foam sprayed thereover and covered by a fibreglass cover, the solar heating installation shown in FIG. 3 being inclined and preferably mounted on a suitable mounting means.

The reservoir 12 is shown connected via an inlet pipe 14 and a pressure reducing valve 15 to a suitable fluid supply arrangement such as a town's water supply.

As has been hereinbefore mentioned, although the heating arrangement of the present invention may be utilized in a solar heating arrangement such as shown in FIG. 3 of the accompanying drawings, the invention resides in the provision of interlocking heating arrangement components, such as shown in FIGS. 1 and 2 of the accompanying drawings and which heating arrangement is suitable for use in any heating installation, such as a domestic radiator or the like.

Thus, by this invention, there is provided a heating arrangement which is readily constructed from a plurality of interlocking components which provide fluid passageways therethrough for heated fluid or fluid which is heated as it passes therethrough.

Although this invention has been described by way of example and with reference to a preferred embodiment of the invention, it is to be understood that modifications and improvements may be effected thereto without departing from the scope of the invention as defined by the appended claims.

I claim:

1. For use in a heating arrangement which in use has fluid flowing therethrough, in combination:
  i. at least one tubular connecting member open at each of its ends and having a through passage, said connecting member having its internal cross-section circular at one of its ends, said connecting member having its external cross-section circular at the other of its ends, said external cross-section being of less diameter than said internal cross-section whereby a plurality of said tubular connecting members may be assembled serially by engagement of an end of each into an end of the next, each connecting member having a portion projecting radially therefrom along part of its length, said projecting portion defining a rectangular passage opening at one end to the exterior of the connecting member and opening at the other end into the through passage of the connecting member, and
  ii. at least one substantially hollow elongate member having at least one end thereof a rectangular cross-section of such dimensions as to fit within the rectangular passage of said projecting portion.

2. The combination of claim 1 wherein said hollow elongate member includes at least one internal longitudinal wall defining a plurality of fluid flow passages therein.

3. The combination of claim 1 wherein each connecting member is an integral moulding.

4. A heating arrangement comprising, in combination:
  a. an assembly formed from two series of the connecting members set forth in claim 1, the members of each series having said other end of less diameter of one said member inserted in said one end of another of said members, and a plurality of elongate members as set forth in claim 1, each of said elongate members having a first said end of rectangular cross-section engaged within said rectangular passage of a member of one of said series of connecting members, each of said elongate members having a second said end of rectangular cross-section engaged within said rectangular passage of a member of the other of said series of connecting members,
  b. an open-ended recessed housing within which said assembly is disposed,
  c. a sheet of at least semi-transparent material mounted over the open end of said housing and above said assembly,
  d. means providing a fluid inlet and a fluid outlet for said housing connected respectively to said series of connecting members.

5. The heating arrangement of claim 4 further comprising a layer of thermally insulating material disposed within said housing and beneath said assembly.

6. In combination, i. the heating arrangement of claim 4
  ii. a thermally insulated fluid reservoir, and
  iii. means connecting said fluid inlet and said fluid outlet to said fluid reservoir.

7. In combination:
  i. a plurality of the heating arrangements of claim 3, and
  ii. means interconnecting said assemblies to provide a continuous fluid flow path therethrough.

* * * * *